(12) United States Patent
Sorondo Zabala et al.

(10) Patent No.: US 9,581,031 B2
(45) Date of Patent: Feb. 28, 2017

(54) METHOD FOR OPTIMIZING THE EFFICIENCY OF WIND TURBINE BLADES

(71) Applicant: GAMESA INNOVATION & TECHNOLOGY, S.L., Sarriguren (Navarra) (ES)

(72) Inventors: Estiibaliz Sorondo Zabala, Sarriguren (ES); Miren Estiibaliz Erauzquin Bilbao, Sarriguren (ES); Jose Luis Carretero Villanueva, Sarriguren (ES)

(73) Assignee: GAMESA INNOVATION & TECHNOLOGY, S. L., Sarriguren (Navarra) (ES)

( * ) Notice: Subject to any disclaimer, the term of this patent is extended or adjusted under 35 U.S.C. 154(b) by 176 days.

(21) Appl. No.: 13/917,983

(22) Filed: Jun. 14, 2013

(65) Prior Publication Data

US 2014/0010961 A1     Jan. 9, 2014

(30) Foreign Application Priority Data

Jun. 15, 2012 (ES) .................................. 201200642

(51) Int. Cl.
*F03D 1/06* (2006.01)
*F01D 5/28* (2006.01)
*C09D 175/04* (2006.01)

(52) U.S. Cl.
CPC ........... *F01D 5/288* (2013.01); *C09D 175/04* (2013.01); *F03D 1/0675* (2013.01); *F03D 80/40* (2016.05); *F05B 2230/90* (2013.01); *Y02E 10/721* (2013.01); *Y02P 70/523* (2015.11)

(58) Field of Classification Search
CPC ....................................................... F03D 1/0675
See application file for complete search history.

(56) References Cited

U.S. PATENT DOCUMENTS

| | | | |
|---|---|---|---|
| 2001/0047058 A1* | 11/2001 | Johnson et al. | 525/192 |
| 2007/0072981 A1* | 3/2007 | Miller | 524/445 |
| 2009/0220795 A1* | 9/2009 | Connelly et al. | 428/414 |
| 2013/0321754 A1* | 12/2013 | Chien et al. | 349/179 |

OTHER PUBLICATIONS

Assender et al., How Surface Topography Relates to Materials' Properties, Science, vol. 297, 2002, pp. 973-976.*
Packham, Surface energy, surface topography and adhesion, International Journal of Adhesion and Adhesives, 23, 2003, p. 437-448.*

* cited by examiner

*Primary Examiner* — James M Mellott
(74) *Attorney, Agent, or Firm* — Ladas & Parry LLP

(57) ABSTRACT

Method for protecting the surface of wind turbine blades manufactured with composites so as to furnish them with a finish resistant to normally-encountered external agents, namely rain, ice and grime from atmospheric pollution; and comprising one step for surface preparation as well as two steps for primer application and a second coating having a specified thickness.

7 Claims, 3 Drawing Sheets

METHOD FOR OPTIMIZING THE EFFICIENCY OF WIND TURBINE BLADES

FIELD OF THE INVENTION

The present invention refers to wind turbine blades and, in particular, to a method of optimizing their efficiency to prevent surface deterioration that alters aerodynamic profile and consequently impairs their level of performance during their useful life.

BACKGROUND

Wind turbines are equipped with a rotor for supporting various blades radially extending from it to capture kinetic energy from the wind, causing the rotation of a drive train coupled to an electric generator to produce electricity.

Wind turbine blade performance is affected by modifications to its aerodynamic profile caused by various agents.

Blade surfaces erode as a result of impacts with rain drops, hail, insects, particles in suspension, etc. The erosion of the leading edge in particular has a highly significant effect on the performance of wind turbine blades.

Blade surfaces could also be altered by the adhesion of some external element. The accumulation of ice on the blade has such a significant effect on performance, that it could require the wind turbine to be stopped. The accumulation of a significant amount of grime also impairs blade performance.

The aforementioned performance issues are further aggravated in lengthy blades installed on wind turbines currently sold on the market.

Common practice in prior art entails applying polyurethane strips on the leading edge of the blades to protect them against, primarily, erosion. However, the effectiveness of these strips is contingent upon their correct placement on the leading edge, which cannot always be attained due to defects in placement or deterioration of the strip during blade transport to the wind turbine site. Additionally, polyurethane strips are facing a potential issue as the trend is to produce larger blades, consequently increasing the aerodynamic noise created by the blade.

Replacing these strips with chemical coatings could prove difficult given the variety of agents that could modify the aerodynamic profile of wind turbine blades.

This invention has been conceived to solve the aforementioned difficulties.

SUMMARY OF THE INVENTION

One object of the present invention is to optimize the efficiency of wind turbine blades manufactured with composites so as to forestall surface deterioration that could modify their aerodynamic profile and result in a decrease in performance both for newly-manufactured blades as well as for blades already installed on wind turbines that have been affected by such deterioration.

Another object of this invention is to provide a method for protecting the surface of wind turbine blades manufactured with composites so as to furnish them with a finish resistant to normally-encountered external agents, particularly rain, ice and grime from atmospheric pollution.

These objects are attained with a method for protecting the surface of wind turbine blades consisting of a first step for surface preparation followed by two steps for applying primer and then a second coating of a given thickness. During the surface preparation stage, the area of the blade intended for protection is sanded down until it attains a certain capacity of adherence determined by one or more of the following surface properties of the area: glossiness, roughness, surface tension. The first coating is a two-component compound of a polyurethane nature. The second coating is a two-component paint with a content of solids comprising 70-80% of its mass, including a base of aliphatic polyols as a binding agent and aliphatic polyisocyanate as a curing agent in a given proportion of 70-80% and 30-20% of its mass respectively. The aforementioned coatings are applied onto either the leading edge or the entire blade surface depending on the environmental conditions that will affect the blade.

In one embodiment of the invention, the paint also includes a solution of nanoparticles of hydrophobic silicon oxides or fluorinated polyhedral oligomeric silsesquioxanes prepared in a proportion comprising 10-30% of its mass. This solution is added to the paint in a percentage of between 5 and 10%. The resulting coating is both erosion-resistant and ice-resistant.

In another embodiment of the invention, the paint also includes a solution of nanoparticles of hydrophilic silicon oxides or titanium oxides prepared in an overall proportion comprising 10-30% of its mass. This solution is added to the paint in a percentage of between 5 and 10%. The resulting coating is both erosion-resistant and grime-resistant.

In another embodiment of the invention, the paint also includes a solution of nanoparticles of hydrophobic silicon oxides or fluorinated polyhedral oligomeric silsesquioxanes, and nanoparticles of hydrophilic silicon oxides or titanium oxides prepared in a proportion comprising 10-30% of its mass. This solution is added to the paint in a percentage of between 5 and 10%. The resulting coating is both erosion-resistant, ice-resistant and grime-resistant.

When the blade surface composite is Glass Fiber Reinforced Epoxy Resin, the step consisting of sanding down during the surface preparation stage will be concluded when the area to protect has a glossiness of less than 5% or a surface tension within the range of 30-35 mN/m.

Further desirable features and advantages of this invention will become evident through the following detailed description of the invention and claims in relation with the accompanying figures.

DETAILED DESCRIPTION OF THE INVENTION

Figure 1A:
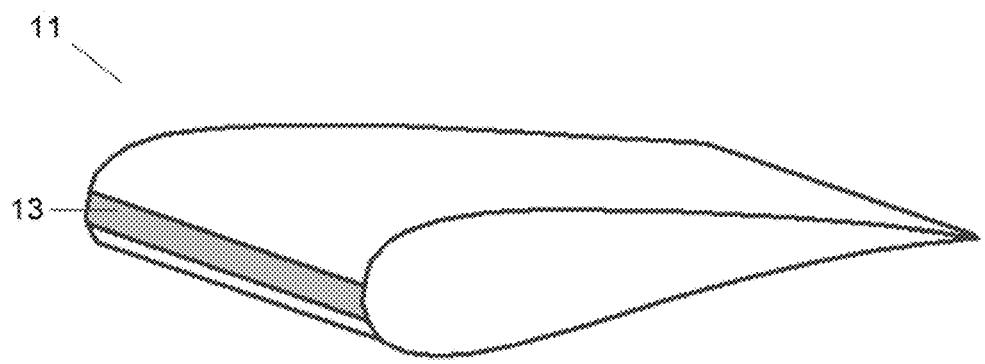
FIG. 1a is a perspective view of the cross section of a wind turbine blade when the coating according to the present invention is applied to the leading edge.

This invention refers to wind turbine blades manufactured with composites and, in particular, with Glass Fiber Reinforced Plastic (GFRP) by known industry methods to do so.

According to this invention, the method for protecting wind turbine blades entails two basic stages: Surface preparation and Coating application.

Surface Preparation

The surface preparation stage entails sanding down (abrasion) the blade surface intended for the protection (either the entire blade or a specific spot thereon) to eliminate any remaining grime, dirt and poorly-affixed material, and, in particular, to create the roughness level sufficing to attain proper adherence with the first coating. Following sanding, the surface is then cleaned by, for instance, vacuuming and "dust-trapping" cotton rags.

The surface is sanded down until obtaining the desired results by using a pre-established control parameter such as glossiness, roughness or surface tension.

For blades made with Glass Fiber Reinforced Epoxy Resin, the estimated required level of adherence corresponds to a glossiness of less than 5% or a surface tension (measured with dyes or dyne test pens) falling within the range of 30-35 mN/m.

Coating Application

The first step entails applying a coating primer based on a two-component compound of a polyurethane nature to cover the niches and pores on the surface following sanding.

The first coating thickness should fall within 400-600 µm on the leading edge area and 300-500 µm on the rest of the blade The ensuing step entails the application of a second coating, based on a two-component paint with an elevated content of solids, including 70-80% of a base of aliphatic polyols as a base resin (or binding agent) and 30-20% of aliphatic polyisocyanate as a curing agent (or hardener). The content of solids falls within the range of 70-80%. The paint will likewise include a solvent and the appropriate additional elements.

If seeking to combine the erosion-resistant property with an ice-resistant property, the paint also includes a solution of nanoparticles of hydrophobic silicon oxides or fluorinated polyhedral oligomeric silsesquioxanes.

If seeking to combine the erosion-resistant property with a grime-resistant property, the paint also includes a solution of nanoparticles of hydrophilic silicon oxides or titanium oxides.

If seeking to combine the erosion-resistant property with ice-resistant and grime-resistant properties, the paint also includes a solution of nanoparticles of hydrophobic silicon oxides or fluorinated polyhedral oligomeric silsesquioxanes, and nanoparticles of hydrophilic silicon oxides or titanium oxides.

The proportion of the solution of nanoparticles in mass within the paint in the possible mixtures mentioned above is between 5 and 10%, which is prepared with a proportion of nanoparticles within 10-30% in mass.

The addition of the aforementioned nanoparticle solution affords grime-resistance and/or ice-resistance because they enhance the properties of contact angles and surface energy.

Blades on wind turbines located or intended to be erected at sites where ice is not an issue will receive a paint with the base material and complemented, as the case may so require, with the nanoparticle solution for the aforementioned grime-resistance.

Blades on wind turbines located or intended to be erected at sites where ice is an issue will receive a paint with the base material and nanoparticle solution for the above ice-resistance, complemented with the nanoparticle solution for grime-resistance if necessary.

Figure 1B:
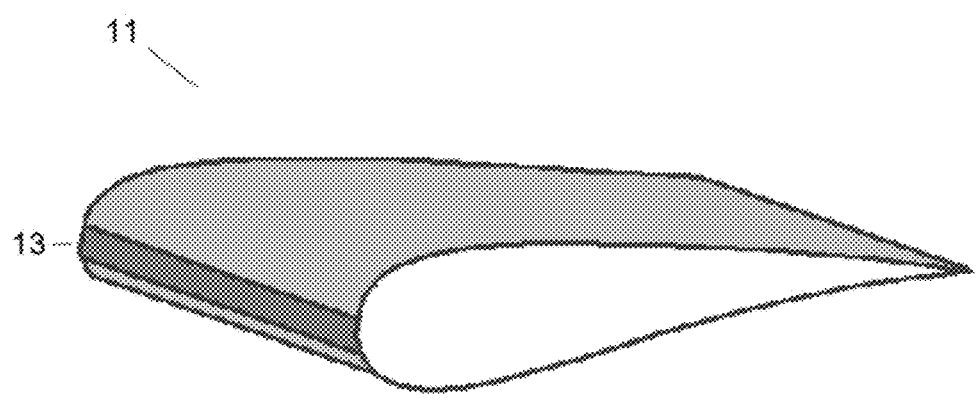
FIG. 1b is a perspective view of the cross section of a wind turbine blade when the coating according to the present invention is applied to the entire blade.

Based on the environmental conditions at the intended site for the blade, the coatings cited above will be applied solely to area 13 on the leading edge of the blade 11 for a width of at least 40 mm as shown in FIG. 1a along the entire surface of the blade 11 as shown in FIG. 1b.

The second coating thickness should fall within 200-250 µm on the leading edge area 13 and between 150 and 200 µm on the rest of the blade. FIG. 1b uses a different grayscale tone for area 13 on the leading edge and the rest of the blade surface to illustrate the difference in the coating thickness.

Coatings will be applied so that there are no transition areas on the edges of areas of application to prevent any discontinuity.

The coatings mentioned herein must be applied at a temperature range of between 15 and 35° C., manually via an "airless" or "airmix" pistol, automated process or even by roller or brush.

The selection of one tool over another will essentially depend on whether coatings will be applied in the blade manufacturing plant or on-site to a deteriorated blade.

Figure 2:
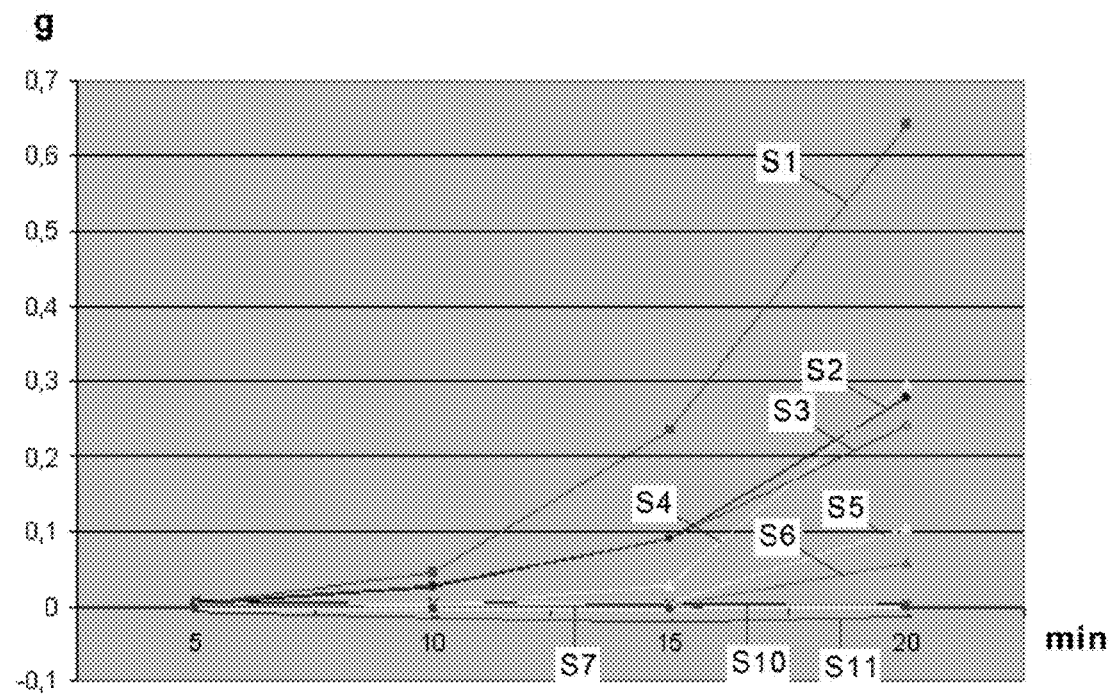
FIG. 2 is a graph charting the results of the erosion-by-rain testing on samples from a wind turbine blade leading edge that has been protected according to the method described in the present invention.

FIG. 2 is a graph representing the loss of mass during erosion-by-rain testing conducted on the following leading edge samples taken from wind turbine blades.

S1—Sample with an epoxy gel coating (thickness: 800 µm).

S2—Sample with a polyurethane compound coating (thickness: 800 µm).

S3—Sample with an adhesive on the substrate and a polyurethane compound coating (thickness: 800 µm).

S4—Sample with polyurethane paint (thickness: 200 µm).

S5—Sample with polyurethane paint (thickness: 300 µm).

S6—Sample with polyurethane paint (thickness: 400 µm).

S7—Sample with a polyurethane strip 320 µm.

S10—Sample with a coating as per the present invention.

S11—Sample with a coating as per the present invention.

Rain testing was conducted under the following conditions:

Impact angle (°): 90.

Raindrop diameter (mm): 2.0.

Speed (m/s): 175.

Dimension of the sample: 50 mm in diameter and 5-10 mm in thickness.

Number of tests/panel: 3/panel.

Rain density (mm/h): 24.3.

Test duration (min): 20.

Stops to control testing: 4 (every 5 minutes).

Figure 3:
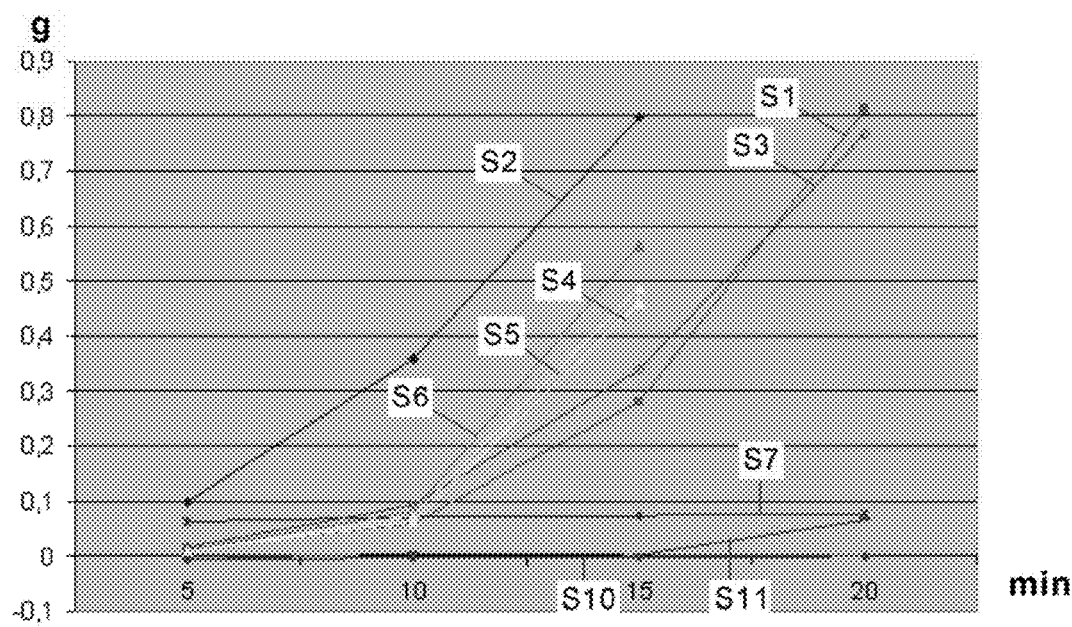
FIG. 3 is a graph charting the results of the erosion-by-rain testing on samples from a wind turbine blade leading edge that has been protected according to the method described in the present invention aged in a UV test.

FIG. 3 is a graph representing the loss of mass of the previous samples during erosion-by-rain testing following ageing by UV testing.

Figure 4:
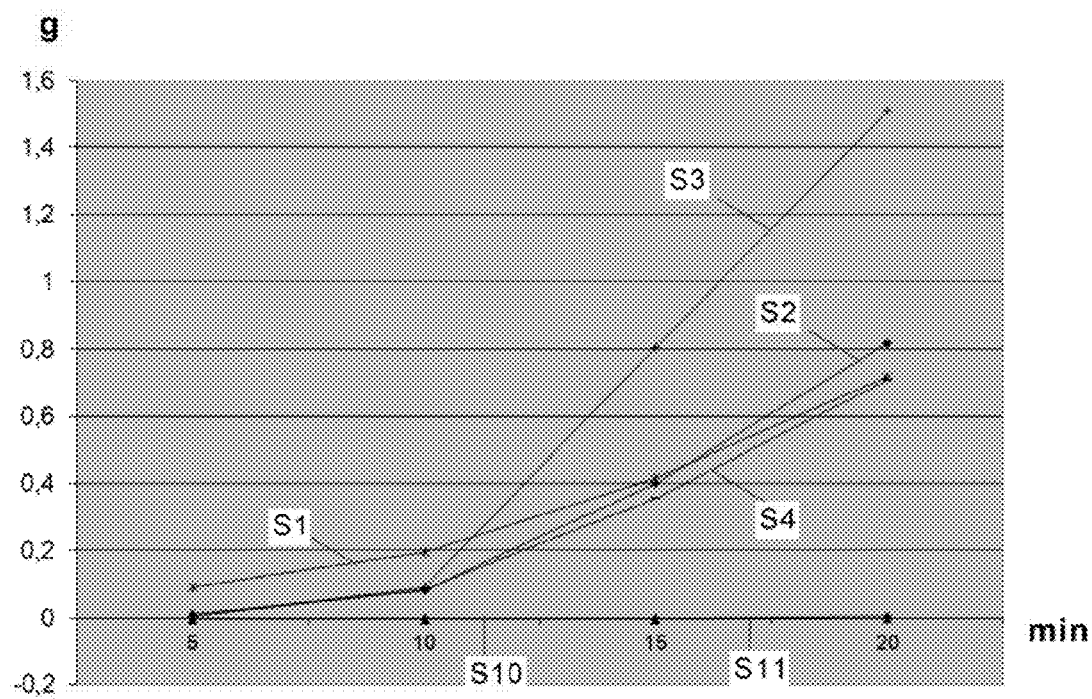
FIG. 4 is a graph charting the results of the erosion-by-rain testing on shell samples from a wind turbine blade that has been protected according to the method described in the present invention.

FIG. 4 is a graph representing the loss of mass during erosion-by-rain testing conducted on the following samples taken from wind turbine blade shells.

S1—Sample with an epoxy gel coating (thickness: 700 µm).

S2—Sample with a polyurethane compound and polyurethane paint (thickness: 150 µm).

S3—Sample with polyurethane paint (thickness: 150 µm).

S4—Sample with a polyurethane compound and polyurethane paint (thickness: 150 µm).

S10—Sample with a coating as per the present invention.

S11—Sample with a coating as per the present invention.

Figure 5:
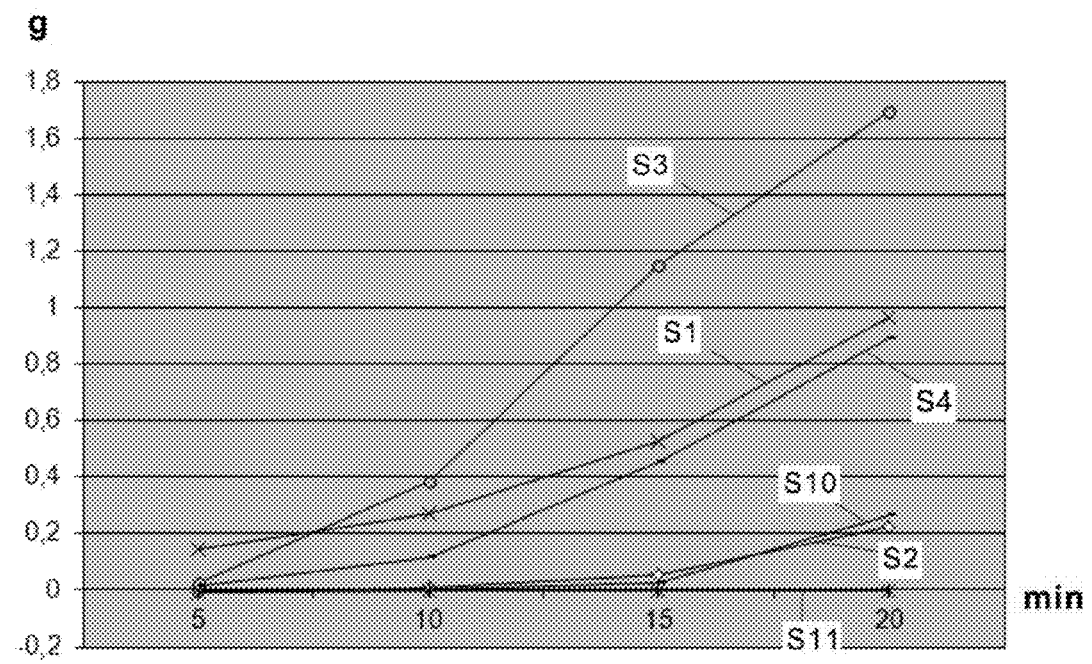
FIG. 5 is a graph charting the results of the erosion-by-rain testing on shell samples from a wind turbine blade that has been protected according to the method described in the present invention aged in a UV test.

FIG. 5 is a graph representing the loss of mass of the previous samples during erosion-by-rain testing following ageing by UV testing.

Promising results were also obtained from other testing, particularly conducted for adherence, flexibility, climatic ageing including the NORSOK standard life cycle and low temperature testing, contact angle and photocatalysis.

In light of the results from these tests, we can consider that the use of the methods according to the present invention could guarantee the useful life of wind turbine blade surface protection for at least 20 years.

While the present invention has been described in relation with various embodiments, the description nevertheless explains that various possible combinations of elements, variations or improvements thereupon while still remaining within the scope of the invention.

The invention claimed is:

1. A method for protecting the surface of a wind turbine blade manufactured with composites by preventing aerodynamic profile modifications during its useful life that would consequently impair its level of performance, comprising steps of:
   a) sanding down an area on a leading edge of the blade intended for protection until its capacity of adherence attains a given level in relation with at least one of the following properties: glossiness, roughness, and surface tension;
   b) applying a first coating onto said area, comprising a two-component compound primer of a polyurethane nature and a thickness range falling within 400-600 µm; and
   c) applying a second coating to said area, comprising a two-component paint with a content of solids comprising 70-80%, including a base of aliphatic polyols as a binding agent and aliphatic polyisocyanate as a curing agent in a given proportion of 70-80% and 30-20% of its mass respectively, and a thickness range falling within 200-250,
   wherein the second coating further comprises nanoparticles of hydrophilic silicon oxides and fluorinated polyhedral oligomeric silsesquioxanes.

2. The surface protection method according to claim 1, wherein the width of said area on the leading edge of the blade is less than 40 mm.

3. The surface protection method according to claim 1, further comprising steps of:
   a) sanding down the rest of the blade surface until its capacity of adherence attains a given level in relation with at least one of the following properties: glossiness, roughness, and surface tension;
   b) applying a first coating to the rest of the blade surface, comprising a two-component compound primer of a polyurethane nature and a thickness range falling within 300-500 µm; and
   c) applying a second coating to the rest of the blade surface, comprising a two-component paint with a content of solids comprising 70-80%, including a base of aliphatic polyols as a binding agent and aliphatic polyisocyanate as a curing agent in a given proportion of 70-80% and 30-20% of its mass respectively, and a thickness range falling within 150-200 µm.

4. The surface protection method according to claim 1, wherein the composite is glass fiber reinforced epoxy resin.

5. The surface protection method according to claim 1, wherein the blade surface area intended for protection is sanded down until its glossiness is less than 5%.

6. The surface protection method according to claim 5, wherein the blade surface area intended for protection is sanded down until its surface tension falls within the range of 30-35 mN/m.

7. The surface protection method according to claim 1, wherein the second coating is formed by combining the two-component paint with a solution of the nanoparticles, wherein the solution of the nanoparticles comprises 5-10% of the mass of the second coating, and wherein the nanoparticles comprise 10-30% of the mass of the solution.

* * * * *